(12) United States Patent
Aravala et al.

(10) Patent No.: US 12,536,327 B2
(45) Date of Patent: Jan. 27, 2026

(54) MULTI-DIMENSIONAL IMAGES FOR SECURE DATA VISUALIZATION

(71) Applicant: Wells Fargo Bank, N.A., San Francisco, CA (US)

(72) Inventors: Srinivasa Rao Aravala, Hyderabad (IN); Gokul Rangababu, Bengaluru (IN); Hari Prasada Raju Kunadharaju, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 99 days.

(21) Appl. No.: 18/749,949

(22) Filed: Jun. 21, 2024

(65) Prior Publication Data

US 2025/0390601 A1 Dec. 25, 2025

(51) Int. Cl.
*G06F 21/62* (2013.01)

(52) U.S. Cl.
CPC .. *G06F 21/6245* (2013.01); *G06F 2221/2141* (2013.01)

(58) Field of Classification Search
CPC ............... G06F 21/6245; G06F 2221/2141
See application file for complete search history.

(56) References Cited

U.S. PATENT DOCUMENTS

| | | | |
|---|---|---|---|
| 10,742,420 B1 | 8/2020 | Griffin | |
| 11,533,175 B1* | 12/2022 | Rao | G06F 9/45558 |
| 11,621,836 B2 | 4/2023 | Ashrafi | |
| 12,469,411 B2* | 11/2025 | Forte | H04L 9/3236 |
| 2020/0235909 A1* | 7/2020 | Morimura | G16H 15/00 |
| 2020/0304290 A1* | 9/2020 | Coulmeau | G06F 21/645 |
| 2021/0248268 A1* | 8/2021 | Ardhanari | G06N 20/00 |
| 2024/0080182 A1* | 3/2024 | Jung | H04L 9/0825 |
| 2025/0150270 A1* | 5/2025 | Ganju | G06F 21/31 |

FOREIGN PATENT DOCUMENTS

| | | |
|---|---|---|
| CN | 110620780 A | 12/2019 |
| CN | 108847050 B | 10/2020 |
| CN | 113744036 A | 12/2021 |
| CN | 114579993 A | 6/2022 |
| CN | 115358748 A | 11/2022 |
| CN | 117729053 A | 3/2024 |
| IN | 202441010802 A | 3/2024 |
| WO | 2023080842 A2 | 5/2023 |

OTHER PUBLICATIONS

Silong Li et. al., Post-Quantum Security: Opportunities and Challenges, sensors, Oct. 26, 2023, p. 1-26, vol. 23, Issue 21, MDPI, https://www.mdpi.com/1424-8220/23/21/8744.

\* cited by examiner

*Primary Examiner* — Frantz B Jean
(74) *Attorney, Agent, or Firm* — Merchant & Gould P.C.

(57) ABSTRACT

An example computer system for securing data with multi-dimensional images can include a computer system for securing sensitive data, the computer system comprising: one or more processors; and non-transitory computer-readable storage media encoding instructions which, when executed by the one or more processors, causes the computer system to: receive the sensitive data; generate a multidimensional image, encrypt the multidimensional image; determine whether an access attempt is authenticated; and responsive to a determination that the access attempt is not authenticated, regenerate the multidimensional image.

20 Claims, 9 Drawing Sheets

MULTI-DIMENSIONAL IMAGES FOR SECURE DATA VISUALIZATION

BACKGROUND

In today's digital landscape, the security of sensitive data is paramount, especially in financial systems where the integrity and confidentiality of data are critical. Traditional data storage and transmission methods are susceptible to breaches resulting from new types of cyber-attacks. Further, advancements in quantum computing pose substantial threats to data secured through traditional encryption methods since these methods are susceptible to quantum attacks.

In addition, the storage and transmission of sensitive data within technological infrastructures pose significant security risks. Despite efforts to implement encryption and access controls, the dependence on infrastructure and human intervention introduces vulnerabilities. For example, the financial industry requires strict data management procedures. However, data support teams require access to data for troubleshooting or maintenance tasks. This access provides opportunities for unauthorized viewing of financial data and potential security breaches.

SUMMARY

Examples provided herein are directed to multi-dimensional images for secure data visualization.

According to one aspect, a computer system for securing sensitive data, the computer system comprising: one or more processors; and non-transitory computer-readable storage media encoding instructions which, when executed by the one or more processors, causes the computer system to: receive the sensitive data; generate a multidimensional image, wherein to generate the multidimensional image includes to: encode the sensitive data within the multidimensional image, and embed metadata within the multidimensional image, encrypt the multidimensional image; determine whether an access attempt is authenticated; and responsive to a determination that the access attempt is not authenticated, regenerate the multidimensional image by shifting data of the multidimensional image including at least the sensitive data encoded within the multidimensional image.

According to another aspect, a method for securing sensitive data, the method comprising: receiving the sensitive data; generating a multidimensional image, wherein generating the multidimensional image includes: encoding the sensitive data within the multidimensional image, embedding metadata within the multidimensional image, encrypting the multidimensional image; determining whether an access attempt is authenticated; and responsive to a determination that the access attempt is not authenticated, regenerating the multidimensional image by shifting data of the multidimensional image including at least the sensitive data encoded within the multidimensional image.

According to another aspect, a non-transitory computer-readable medium having stored thereon one or more sequences of instructions for causing one or more processors to perform: receiving sensitive data; generating a multidimensional image, wherein generating the multidimensional image includes: encoding the sensitive data within the multidimensional image, embedding metadata within the multidimensional image, encrypting the multidimensional image; determining whether an access attempt is authenticated; and responsive to a determination that the access attempt is not authenticated, regenerating the multidimensional image by shifting data of the multidimensional image including at least the sensitive data encoded within the multidimensional image.

The details of one or more techniques are set forth in the accompanying drawings and the description below. Other features, objects, and advantages of these techniques will be apparent from the description, drawings, and claims.

DETAILED DESCRIPTION

This disclosure relates to multi-dimensional images for secure data visualization. Industries with sensitive data often have teams that maintain access to all secured data for maintenance and other functions. This access can result in security vulnerabilities since an entity from the data operations team can access the data and view its content. Moreover, traditional methods for encrypting the data are vulnerable to quantum attacks that may be able to decrypt and access the confidential data.

The described system stores data in the form of multidimensional signature images, thereby enhancing security and mitigating quantum-related risks. Unlike traditional data representations, multidimensional images encapsulate various dimensions of information, enhancing security and enabling dynamic behavior in response to breaches. It also implements effective access control and display controls to manage how sensitive data is visualized.

Each image contains signatures representing various dimensions of the data, including access permissions, expiration timelines, and behavior upon breach. The images are stored in databases, logs, or files, and access is granted based on authenticated dimensions. Multidimensional image creation includes steps related to the dimensions of the image to ensure comprehensive data representation and robust security measures. In addition, the multidimensional images are configured to regenerate upon an unauthorized access and collapse after a number of failures. By regenerating in the case of a breach, the sensitive data remains secure. In some embodiments, quantum resistant algorithms are also used to encrypt the data within the multidimensional image to protect against quantum attacks.

Figure 1:
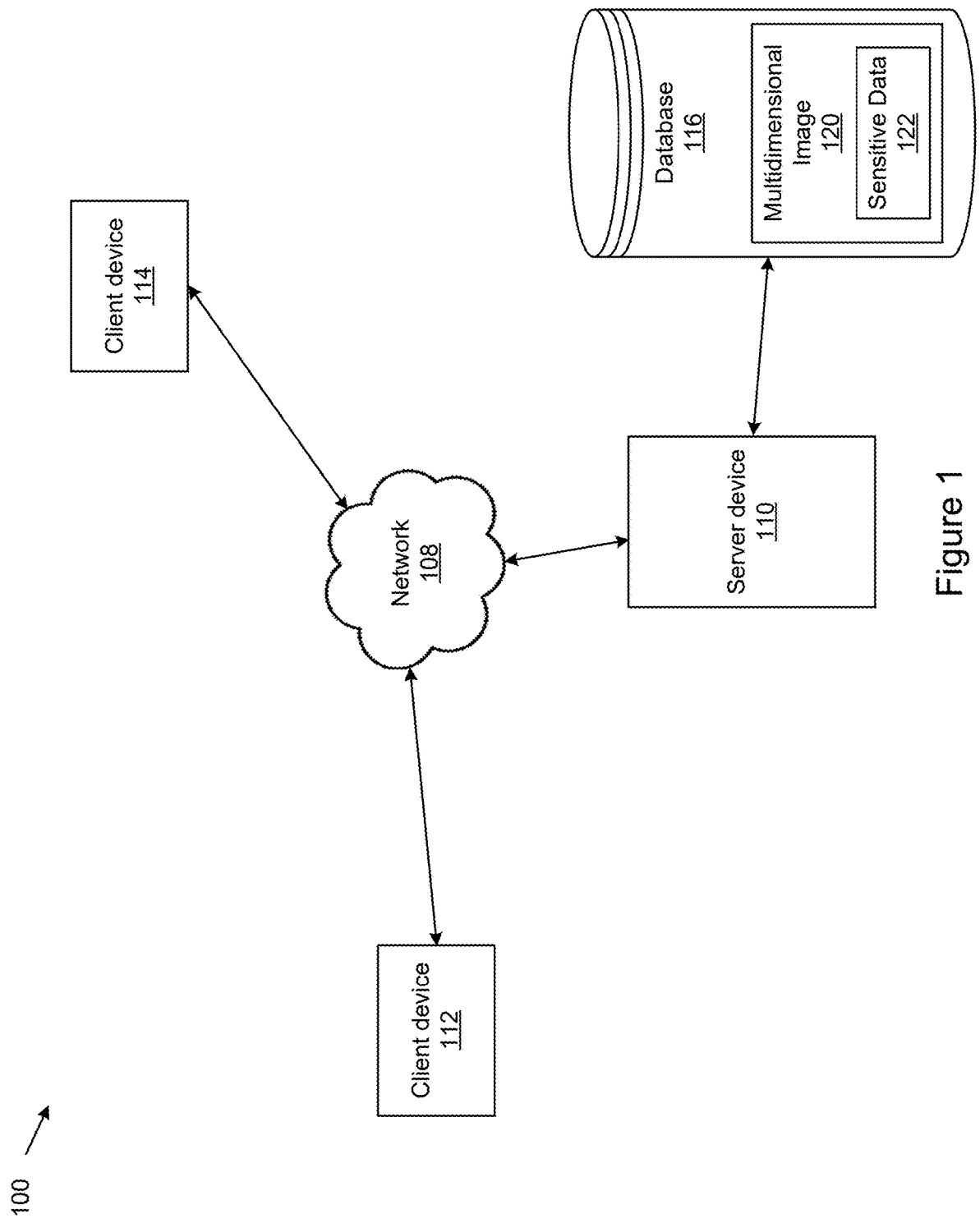
FIG. 1 schematically shows an example system for encrypting sensitive data within a multidimensional image.

FIG. 1 schematically shows an example system 100 for encrypting sensitive data 122 within a multidimensional image 120. In this embodiment, a server device 110, a client device 112, and a client device 114 connect through a network 108. Further, the server device 110 connects to the database 116.

In the shown embodiment, each of the devices may be implemented as one or more computing devices with at least one processor and memory. Example computing devices include a mobile computer, a desktop computer, a server computer, or other computing device or devices such as a server farm or cloud computing used to generate or receive data.

In some non-limiting examples, the server device 110 is owned by a financial institution, such as a bank. The client devices 112, 114 can be programmed to communicate with the server device 110 to perform various tasks, such as financial transactions. Many other configurations are possible, and the disclosure is not limitation to the financial industry.

The example client devices 112, 114 can be used by customers and/or team members of the financial institution to perform various tasks. For instance, a team member of the financial institution can use the client device 112 to perform tasks such as access financial settings and documents, transactional accounts, etc. Similarly, a customer of the financial institution can use the client device 114 to perform such tasks.

In some embodiments, the client devices 112 and 114 are trading devices. Each client device 112 and 114 is configured to execute a trade of securities (e.g., stocks, currencies, etc.) for an associated user account. Further, the client devices 112 may transmit data related to a trade to the server device 110 or the client device 114. The trade data may include the sensitive data 122 that is to be kept confidential. For example, the sensitive data 122 may include information about a trade that can be used for insider trading if seen by an unauthorized individual. Further, protecting the sensitive data 122 is often required by securities law. Thus, the sensitive data 122 is encrypted within the multidimensional image 120 for protection.

The client device 112 or the server device 110 may perform the operations to generate the multidimensional image 120. In some embodiments, the client device 112 makes an API call to a multidimensional image generation application to generate the multidimensional image 120 and encrypt the sensitive data 122 within the multidimensional image 120. Further, the multidimensional image 120 may be stored in the database 116. In some embodiments, the database 116 is a specialized database storage schema that is designed to accommodate multidimensional images, ensuring efficient retrieval and management of secure data.

In some embodiments, client device 112 connects to the server device 110 for securing the sensitive data 122 for purposes other than sending a message to the client device 114. The client device 112 includes a plug-in that is configured to store sensitive data 122 of a user account in the multidimensional image 120. The user account may be associated with a financial institution. Further, the plug-in is compatible with the application, which may also be associated with the financial institution. Plug-ins that perform these features interface with the application through an API or other interface that integrates the functions of the plug-in with the application.

The sensitive data 122 includes confidential information. It may be regarding a user, such as name, address, and financial information. In other embodiments, the sensitive data 122 includes trade information such as an entity placing an order for a number of stocks. To prevent potential insider trading or other breaches of security laws, the sensitive data 122 is kept confidential by encoding the sensitive data 122 into the multidimensional image 120 and encrypting the multidimensional image 120. This prevents unauthorized users from accessing and seeing the sensitive data 122.

In some embodiments, the client device 112 has access to the sensitive data 122 for data production services. Data production support services include functions that ensure reliability, accuracy, and accessibility of data systems. For example, the services may involve maintaining data systems by monitoring the health of databases, data pipelines, and other infrastructure for data operations. Other services include troubleshooting issues and managing user requests. As a result, data production teams may require access to the sensitive data 122 using the client device 112.

The sensitive data 122 is protected by being encoded within the multidimensional image 120, which is then encrypted. Thus, the client device 112 can be configured to display the sensitive data 122 as the multidimensional image 120 to protect the data and prevent unauthorized viewing. Display of the multidimensional image 120 may be according to visualization parameters of the multidimensional image 120. Further, the client device 112 can still perform the specified services without viewing the sensitive data.

Figure 2:
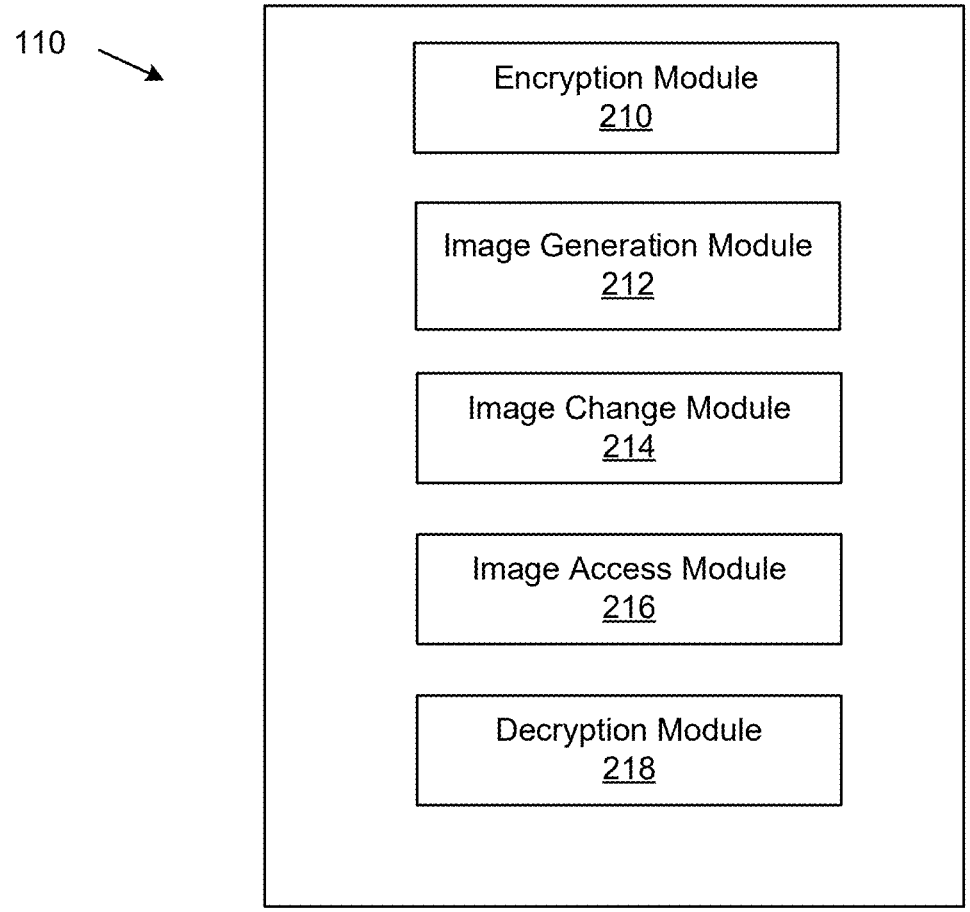
FIG. 2 shows example logical components of a server device of the system of FIG. 1.

Referring now to FIG. 2, additional details of the server device 110 are shown. The server device 110 includes an encryption module 210, an image generation module 212, an image change module 214, an image access module 216, and a decryption module 218.

The encryption module 210 provides the functions of encrypting data. Other modules or components may use the encryption module 210 to encrypt selected data, such as sensitive data 122 or other data that is used in the generation of the multidimensional image 120. In some embodiments, the encryption module 210 employs quantum-resistant encryption algorithms to safeguard the underlying data. These encryption techniques leverage mathematical principles that are resistant to attacks from quantum computers, ensuring the confidentiality and integrity of the data even in the face of advanced adversaries.

Examples of quantum-resistant algorithms include lattice-based cryptography, hash-based cryptography, and code-based cryptography. Lattice-based cryptography use mathematical lattices to encrypt data, and an example includes crystals-kyber and crystals-dilithium. Hash-based includes building secure systems with hash functions. An example of hash-based cryptography includes sphincs+. Code-based cryptography employes error-correcting codes, which introduce errors into the data and has to be reversed to read the accurate data. An example includes McEliece cryptosystem. Other encryption methods can be used as well. Further, the encryption module 210 may provide decryption methods for decrypting the sensitive data to the decryption module 218. For example, the encryption module 210 also can provide decryption features to other components, such as the decryption module 218, such as private keys or other necessary items for decryption.

The image generation module 212 provides the functions of generating the multidimensional image 120. The multidimensional image 120 can include a variety of different dimensions. These dimensions can include the sensitive data, access permissions, expiration timelines, and behavior upon breach. Each dimension represented as data signatures that is used as a dimension of the multidimensional image 120. The data signatures representing the dimension can be integrated into the multidimensional image.

Integrating the data signatures into the multidimensional image includes encoding the data of the data signatures into bits of the corresponding code of the image. The image generation module 212 determines which dimensions should be used to generate the multidimensional image 120. In some embodiments, image generation module 212 receives a predetermined number of dimensions to use to generate the multidimensional image 120. In other embodiments, the image generation module 212 determines the number of dimensions based on available data associated with the sensitive data 122.

The image generation module 212 collects data, such as metadata, to be used as signature dimensions. In some embodiments, this feature includes gathering comprehensive information about the data to be represented. Context of the data may be used for generating the multidimensional image 120. For example, the type of data (e.g., text in a document), length, and surrounding elements of the sensitive data may be determined.

Further, the image generation module 212 identifies authorized users and user devices that can access the sensitive data 122. Access permissions may vary depending on user roles, organizational hierarchy, or specific requirements. Integrating user information into the multidimensional image 120 can ensure that access controls are enforced at the granular level, enhancing security. In some embodiments, the image generation module 212 receives indicated users that are authorized to access sensitive data 122. Other embodiments include determining the authorized users at time of generation.

When generating the multidimensional image 120, the image generation module 212 also specifies the image behavior. The multidimensional image 120 can be designed to exhibit dynamic behavior in response to security events such as breaches or unauthorized access attempts. This behavior is predetermined based on security policies and requirements. For example, the multidimensional image 120 may regenerate and collapse after a certain number of access attempts or expire after a specified timeframe to prevent prolonged exposure of sensitive data. The image generation module 212 includes this behavior data within the generated multidimensional image 120. The behavior data is encrypted as a signature dimension as well.

Further, the image generation module 212 determines visualization parameters for the multidimensional image. The visualization parameters of the multidimensional image 120 dictate how the data is presented and interpreted by authorized users. This may include aspects such as image resolution, color coding, and spatial arrangement of data elements. Controlling the visualization parameters can provide an intuitive and informative visual representation that facilitates data interpretation while maintaining security. The image generation module 212 configures the multidimensional image 120 to display according to the determined visualization parameters. In some embodiments, the visualization parameters are integrated into the multidimensional image 120 as a signature dimension. In some embodiments, the visualization parameters are metadata embedded as metadata within the multidimensional image 120.

The image generation module 212 also integrates data expiration and retention policies into the multidimensional image 120. The multidimensional image 120 can incorporate data expiration and retention policies to ensure compliance with regulatory requirements and mitigate security risks. These policies define the lifespan of the image and specify actions to be taken upon expiration, such as archival or deletion. By enforcing expiration and retention policies, the risk of unauthorized data exposure is minimized.

In some embodiments, the data expiration and retention policies include dynamic behavior functions for the multidimensional image 120. The image generation module 212 configures the image to regenerate based on the dynamic behavior functions. For example, if an unauthorized access attempt is made to the sensitive data 122 of the multidimensional image 120, then the multidimensional image 120 will regenerate and shift the bits of the data signatures, which include the encrypted sensitive data 122 and other data signatures, to different positions within the data corresponding to the multidimensional image. More details are discussed in association with FIGS. 6 and 7.

For each signature dimension, the image generation module 212 encodes the associated data into pixels of the multidimensional image 120. This process helps generate an image that is itself a secure container for the data it represents. In this embodiment for encoding the signature dimensions, the image generation module 212 preprocesses the associated data of each signature image. The signature dimensions may include the sensitive data 122 and associated metadata such as functional data, user data, and access control information data. The metadata may be embedded within the multidimensional image 120 as a signature dimension. The data is preprocessed to ensure the data is in a suitable format.

For example, the data is split into smaller chunks if the data size exceeds the image size. Splitting the data into smaller chunks may include iterating over the data of each signature dimension and determining the start and end indices of each chunk. Then, an empty n×n image matrix is created. In some embodiments, the dimensions of the image matrix are different. The image generation module 212 also determines the range of values each pixel value of the multidimensional image 120 can take. For example, the values of each pixel may range from 0 to 255 if the multidimensional image 120 is grayscale.

Each data chunk value is mapped to the range of values for the multidimensional image 120 resulting in scaled values. The scaled values are converted to pixel intensities. These pixel intensities then form the multidimensional image 120 at the mapped values. Other functions may be performed as well. An example implementation of pseudo-code is shown below:

```
{
function encode_data_to_image(data, n):
   preprocessed_data = preprocess_data(data)
   image_size = n * n
   data_chunks = split_data_into_chunks(preprocessed_data,
   image_size)
   image = create_empty_image(n)
   for i from 0 to min(length(data_chunks), n):
      for j from 0 to min(length(data_chunks[i]), n):
         pixel_value = encode_data_chunk_to_pixel(data_chunks[i][j])
         image[i][j] = pixel_value
   return image
function encrypt_image(image, key):
   encrypted_image = quantum_resistant_encrypt(image, key)
   return encrypted_image
}
```

In addition, the image generation module 212 encrypts the data of the data signatures within the multidimensional image 120. To encrypt with quantum-resistant techniques, the image generation module 212 utilizes the encryption module 210. The encoded data of the multidimensional image 120 can then be encrypted using quantum resistant encryption methods by the encryption module 210. Using this process, the data of each signature dimension is encrypted within the multidimensional image 120.

In some embodiments, the image generation module 212 encodes the data of the data signatures into the multidimensional image after encrypting. An example implementation of pseudo-code is shown below:

```
{
    function encrypt_image(image, key):
        encrypted_image = quantum_resistant_encrypt(image, key)
        return encrypted_image
}
```

The image change module 214 provides features of regenerating the multidimensional image 120 after an access attempt. As other computing devices attempt access to the sensitive data within the multidimensional image 120, the multidimensional image 120's corresponding data changes or updates based on the if the access was successful. For example, the image change module 214 is configured to regenerate the image and collapse the image after a certain number of access attempts or expire after a specified timeframe to prevent prolonged exposure of sensitive data. If the access attempt was unsuccessful, the image change module 214 regenerates the underlying bits of data for the multidimensional image 120 to secure the sensitive data 122 that is encoded within the multidimensional image 120. The image change module 214 may be configured based on specified data retention policies.

In some embodiments, the image change module 214 receives a request to change the image (e.g., regenerate or collapse) the multidimensional image 120. The request may be from a database that stores multidimensional image 120. Responsive to receiving the request, the image change module 214 changes the multidimensional image 120 according to the data retention policies. In some embodiments, changing the multidimensional image 120 includes shifting the bits associated with multidimensional image 120 according to a specified algorithm.

Other embodiments include collapsing the multidimensional image 120. Collapsing the multidimensional image 120 may include making the data of the multidimensional image 120 unrecoverable. This function can include deleting the multidimensional image 120 and the sensitive data 122 from the database, thus, resulting in the sensitive data 122 being inaccessible. For example, the sensitive data 122 has not been utilized over a certain amount of time, and the data retention policies specify to delete sensitive data and the multidimensional image 120 that stores the sensitive data 122. In additional embodiments, pixel intensities of the encoded data within the multidimensional image 120 are altered.

The image access module 216 provides the features of control access to the multidimensional image 120. Once the client device 112 attempts to access the sensitive data 122 of the multidimensional image 120, the image access module 216 determines if the client device 112 has proper credentials to access the sensitive data 122 based on the integrated access permissions within the multidimensional image 120. If the client device does not have the proper credentials, the image change module 214 may regenerate the multidimensional image 120 to secure the sensitive data 122.

If the client device 112 has the proper credentials, then the client device 112 is allowed to access the sensitive data 122. In some embodiments, the client device 112 displays the sensitive data 122 according to the integrated visualization parameters, stored as a signature dimension, of the multidimensional image 120. Further, the image access module 216 may deconstruct the multidimensional image 120 to reveal the sensitive data 122. In some embodiments, the image access module 216 decrypts the multidimensional image 120 using the decryption module 218.

The decryption module 218 decrypts the data of the multidimensional image 120 to allow access to the sensitive data 122. Before the sensitive data 122 can be properly displayed and accessed, the decryption module 218 decrypts the data of the multidimensional image 120. After decryption, the sensitive data 122 can be accessed and displayed. In some embodiments, the sensitive data 122 is displayed according to the integrated visualization parameters. Other embodiments may include displaying the sensitive data without additional data or other access controls.

Further, the decryption module 218 uses access methods that correspond to the quantum-resistant encryption methods used by the image generation module 212. For example, the decryption module 218 uses a private key with a value that is needed for a decryption algorithm of the data of the multidimensional image 120. The private key may only be accessible by the decryption module 218 to ensure proper access. Additional decryption methods are used in other embodiments such as a hardware embedded key with necessary information about the encrypted data to recover the sensitive data 122.

Figure 3:
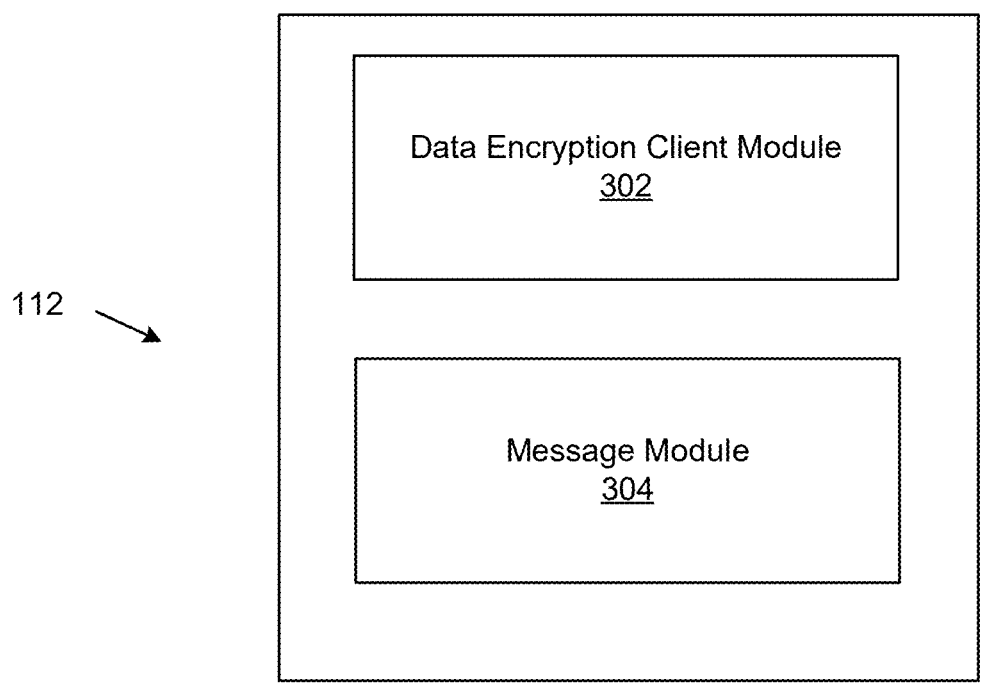
FIG. 3 shows example logical components of a client device of the system of FIG. 1.

FIG. 3 shows example logical components of the client device 112 of the system 100. The client device 112 includes a data encryption client module 302, message module 304, and the display module 306.

The data encryption client module 302 provides the functions of enabling the client device 112 to secure the sensitive data 122 as the multidimensional image 120. Further, the data encryption client module 302 connects through the network 108 to the server device 110. In some embodiments, the client device 112 uses this connection to use the image generation module 212 of the server device 110 to generate the multidimensional image 120 and secure the sensitive data 122.

For example, the client device 112 may need to transmit the sensitive data 122 to the server device 110 for storage in the database 116. The sensitive data 122 may be confidential data associated with a user of the client device 112 that needs to be securely stored. The server device 110 receives the request and generates the multidimensional image 120 to secure the sensitive data 122. In another example, the server device 110 receives a request to access the sensitive data from the client device 114.

The server device 110 authenticates the client device 114 has proper access and sends the sensitive data 122 to the client device 114. Further, the server device 110 may send the multidimensional image 120 to the client device 114. The sensitive data 122 is then displayed according to corresponding visualization parameters. In other embodiments, the data encryption client module 302 includes some or all of the functions of each module of the server device 110 for generating multidimensional images to secure various sensitive data.

The message module 304 provides messaging functionality to the client device 112. For example, the message module 304 can be used to initiate a trade of securities with the server device 110 or the client device 114. In other embodiments, the message module 304 is used to send a message with the sensitive data 122 to an external device such as the server device 110 or the client device 114. The message module 304 also uses the data encryption client module 302 to secure the sensitive data 122 that is within the generated message. In one embodiment, the message module 304 uses a secure communication protocol, such as HTTPS or TLS, to transmit the multidimensional image 120 securely over the network 108. In some embodiments, the message module 304 is also included with the server device 110.

In alternative embodiments, the client device 112 or the client device 114 can also include additional functionality, including functionality described herein as being performed by the server device 110. For instance, the client device 112 can include one or more of the functionalities provided above performed by the encryption module 210, image generation module 212, image change module 214, image access module 216, or the decryption module 218 of the server device 110. Further, the client device 114 may have the same or similar components of the client device 112.

Figure 4:
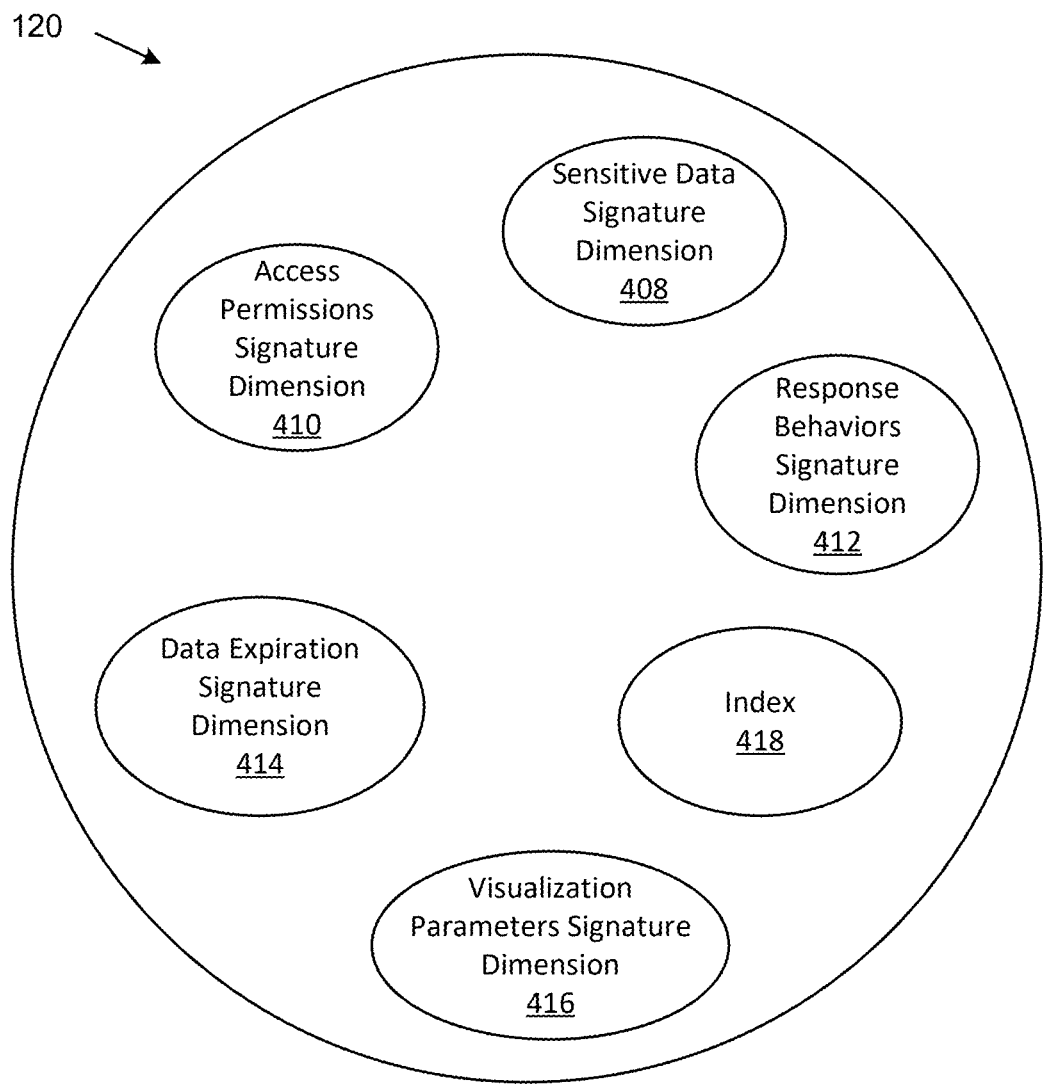
FIG. 4 shows example signature dimensions of the multidimensional image generated by the system of FIG. 1.

FIG. 4 shows an example embodiment of the multidimensional image 120 as generated by the image generation module 212 and stored in the database 116. The example multidimensional image 120 includes the signature dimensions: sensitive data signature dimension 408, access permissions signature dimension 410, response behaviors signature dimension 412, data expiration signature dimension 414, visualization parameters signature dimension 416, and the index 418. In this embodiment, the multidimensional image 120 is generated by the image generation module 212 to include the shown signature dimensions. These signature dimensions indicate various aspects of the multidimensional image 120. Each of these signature dimensions may be metadata about the multidimensional image 120 or the sensitive data 122.

The sensitive data signature dimension 408 includes the sensitive data 122. Further, the sensitive data signature dimension 408 is the encoded data within the multidimensional image 120 of the sensitive data 122. The sensitive data signature dimension is in the form of encrypted bits and stored within the multidimensional image 120.

The access permissions signature dimension 410 includes data indicating client devices or associated users that have access to the sensitive data 122. For example, the access permissions signature dimension 410 may include a list of user credentials for accessing the sensitive data 122. The user credentials may include usernames, client devices, and associated passwords or keys for accessing the sensitive data 122. The access permissions signature dimension 410 may be accessible by the image access module 216 for determining if a requesting device has the proper credentials to access the sensitive data 122.

The response behaviors signature dimension 412 specifies the dynamic behavior of the image upon an unauthorized access. As discussed with the image generation module 212, the dynamic behavior integrated within the response behavior signature dimension 412 may include regenerating the multidimensional image 120 (e.g., shifting the underlying bits of the multidimensional image 120). Further, the dynamic behavior may specify to collapse the multidimensional image 120 upon a number of unauthorized access attempts. The collapse of the multidimensional image 120 makes the sensitive data 122 unretrievable.

In some embodiments, the response behaviors signature dimension 412 includes a predetermined threshold for a number of access attempts. Once the number of access attempts is met or exceeded, the multidimensional image 120 collapses. Other behaviors may be included as well.

The data expiration signature dimension 414 includes a predetermined amount of time that the multidimensional image 120 can be stored. After the data lifetime of the multidimensional image 120 exceeds the predetermined amount of time, the multidimensional image 120 collapses or is deleted according to a specified policy. Storing data for the predetermined amount of time increases security of the sensitive data 122 since it is not stored if the sensitive data 122 is no longer needed. In some embodiments, the data expiration signature dimension 414 does not include a predetermined amount of time. The multidimensional image 120 is thus stored for an undefined amount of time or until it is manually deleted.

The visualization parameters signature dimension 416 includes the previously discussed visualization parameters determined by the image generation module 212. As discussed above, the visualization parameters of the multidimensional image 120 dictate how the data is presented and interpreted by authorized users. This may include aspects such as image resolution, color coding, and spatial arrangement of data elements.

The index 418 is used for searching for the multidimensional image 120 while it is stored in the database 116 or files or in any other storage platform. The index 418 can use properties of the encryption scheme or additional encrypted data structures to allow searching without decrypting the entire dataset. This feature can be useful for applications like searchable encryption, where you need to find information within encrypted data without compromising security. In some embodiments, the index 418 of the encryption scheme or additional encrypted data structures allow searching without decrypting the entire dataset. This can be used for applications like searchable encryption, where you need to find information within encrypted data without compromising security. In additional embodiments, the index 418 is used to detect tampering or unauthorized modifications of encrypted data by checking for inconsistencies with the index structure.

In some embodiments, the index 418 also contains the index of all the functional information of the multidimensional image 120. The index 418 acts as a discovery that holds the information at a bit level. In other words, the index 418 provides the range of bits where each of the signature dimensions 408-416 are stored. For example, the offset of the bit range 0-40 represents the retrieval information, an offset of 41-87 bits represents the authorized users, an offset of 87-134 bits represents the sensitive data 122, an offset of 136-200 bits represents invalid attempt access, and an offset 215-245 bits represents image decryption information.

Figure 5:
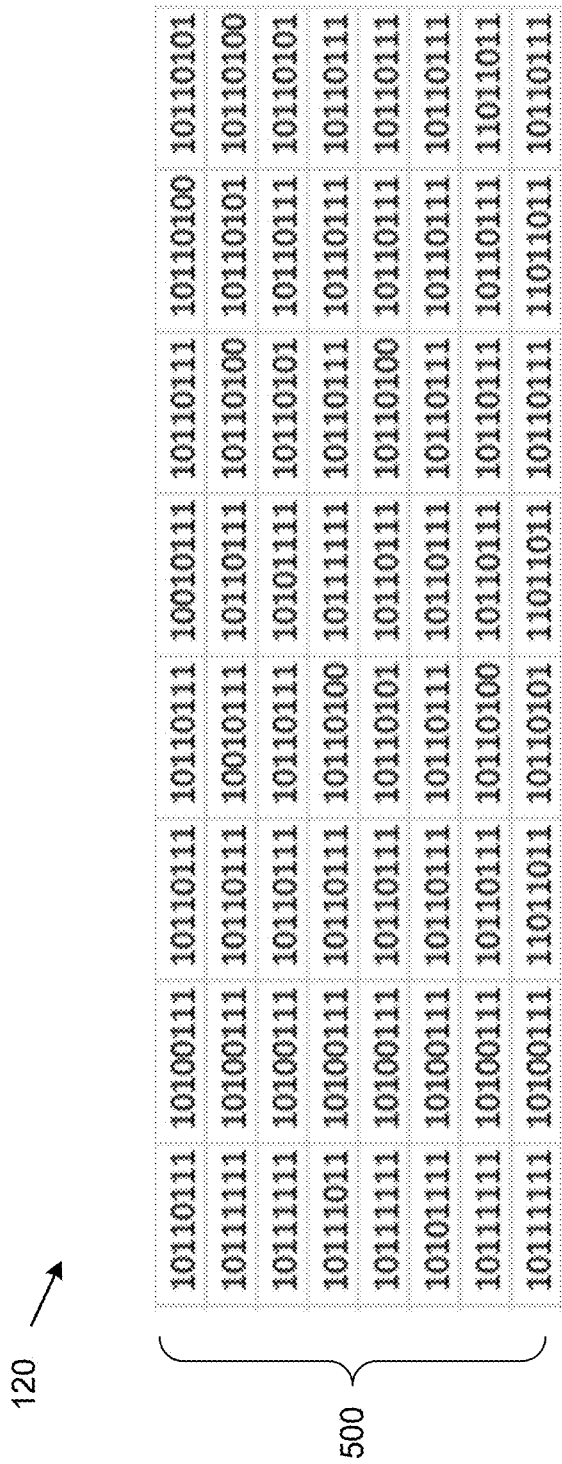
FIG. 5 shows an example binary representation of the multidimensional image generated by the system of FIG. 1.

Referring now to FIG. 5, an example binary representation 500 corresponding to the multidimensional image 120 is shown. The binary representation 500 is generated by the image generation module 212. Each byte may correspond to one of the previously mentioned signature dimensions. Further, the shown bytes of bits may shift upon a regeneration. In this embodiment, the binary representation 500 shows an 8-dimensional 8-bit binary data. In other embodiments, the binary representation 500 is an N-dimensional multidimensional image. A different number of bits may also be used.

Figure 6:
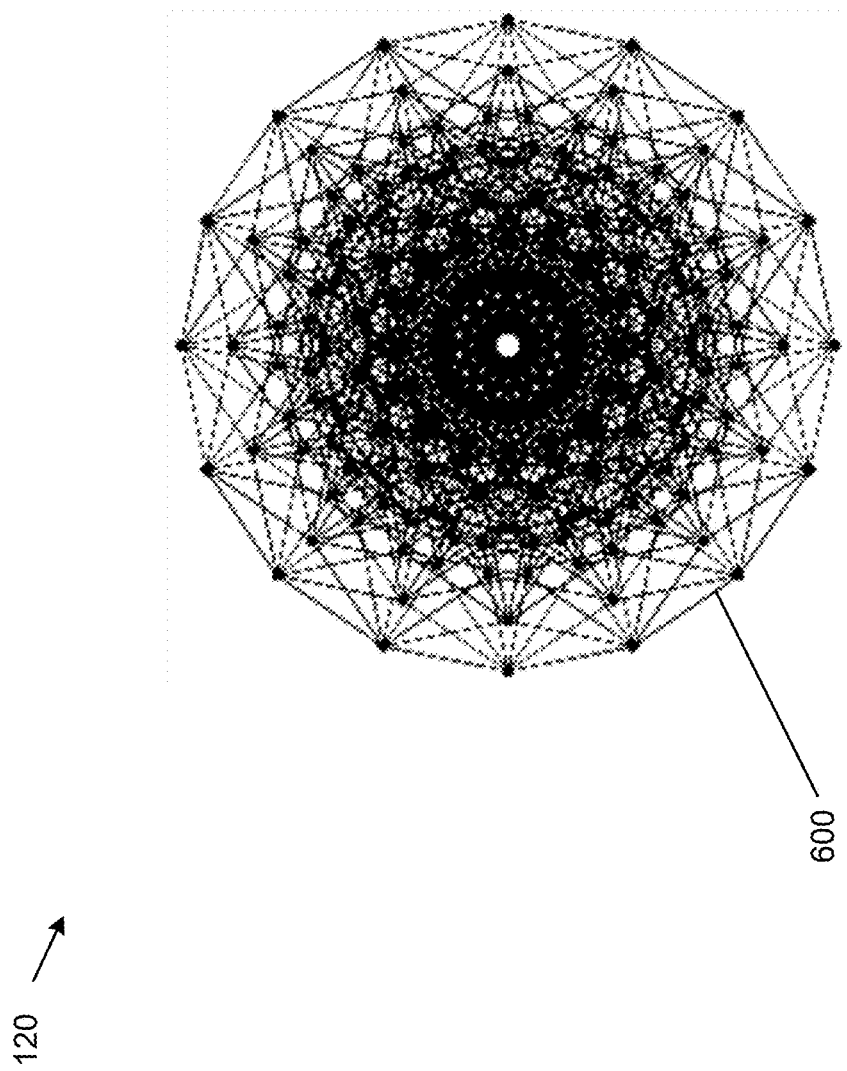
FIG. 6 shows an example image representing the multidimensional image of FIG. 5.

FIG. 6 shows an example displayed image 600 of the multidimensional image 120. In this embodiment, the displayed image 600 of the multidimensional image 120 corresponds to the binary representation 500 of FIG. 5. Further, the multidimensional image 120 may be a variety of formats such as joint photographic experts group (JPEG), portable network graphics (PNG), etc. In other embodiments, a different image is generated to represent the binary representation 500. In addition, the displayed image includes all of the signature dimensions encoded as data as shown in the binary representation 600.

Figure 7:
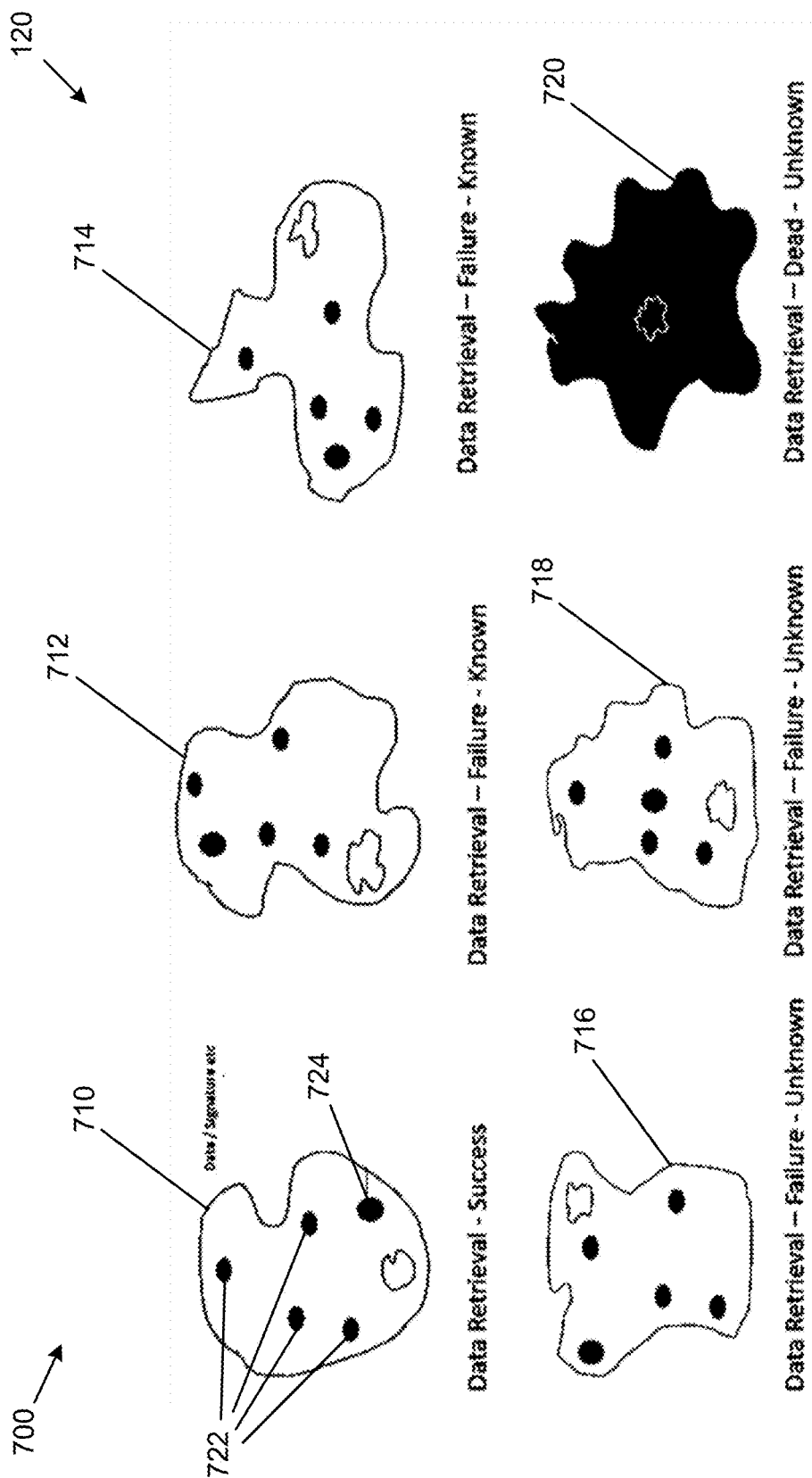
FIG. 7 shows example states of the multidimensional image of FIG. 4 depending on access attempts.

FIG. 7 shows an example plurality of states 700 of the multidimensional image 120. The server device 110 secures signature dimensions 722 within the multidimensional image 120 by causing the multidimensional image 120 to change states. The states 710-720 illustrate example regenerations of the multidimensional image 120 based on improper access attempts. Each of the states 710-720 illustrate the multidimensional image 120 in a different state depending on an access attempt. In some embodiments, any of the shown states 710-720 can regenerate into the other shown states.

As shown, the state 710 includes the signature dimensions 722 and the index 724. Similar to the multidimensional image 120 shown in FIG. 4, the signature dimensions 722 are encoded within the state 710. The state 710 may be generated by the image generation module 212. In some embodiments, the signature dimensions 722 includes the signature dimensions 408-418. After an unauthorized access attempt, the multidimensional image 120 regenerates and changes from the state 710 to the state 712.

In some embodiments, the multidimensional image 120 is regenerated and changes state from the state 710 into the state 712 by the image change module 214. In this example, the data retrieval failure was known. Another unauthorized access attempt causes the state 712 to regenerate as state 714. The process repeats to create the states 716 and 718. As seen, the multidimensional image 120 regenerates and shifts the signature dimensions within the multidimensional image 120 depending on the state.

The states 712 and 714 are known failures and the states 716, 718, and 720 are unknown. Known failures are those failures where the identity of the source can be validated, however the attempt to retrieve the data from image by the source could be accidental. For example, an employee of the entity that manages the multidimensional image 120 attempted access, but they lack the proper credentials. Unknown failures are those failures where the identity of the source cannot be validated, and the source is attempting to retrieve the data from image with malicious intention. For example, a computing device with no connection to the entity managing the data attempted access without proper credentials. Since the access attempt was external, the failure is unknown.

After too many access attempts, the multidimensional image 120 collapses, thus, changing from state 718 (or any of the other states) into the state 720 where the signature dimensions 722 are not recoverable. Accordingly, the signature dimensions 722, including the sensitive data 122, within the multidimensional image are kept secure. In some embodiments, an authorized data retrieval is performed, and any of the states 712-718 regenerate as the state 710 so the sensitive data 122 can be accessed.

Figure 8:
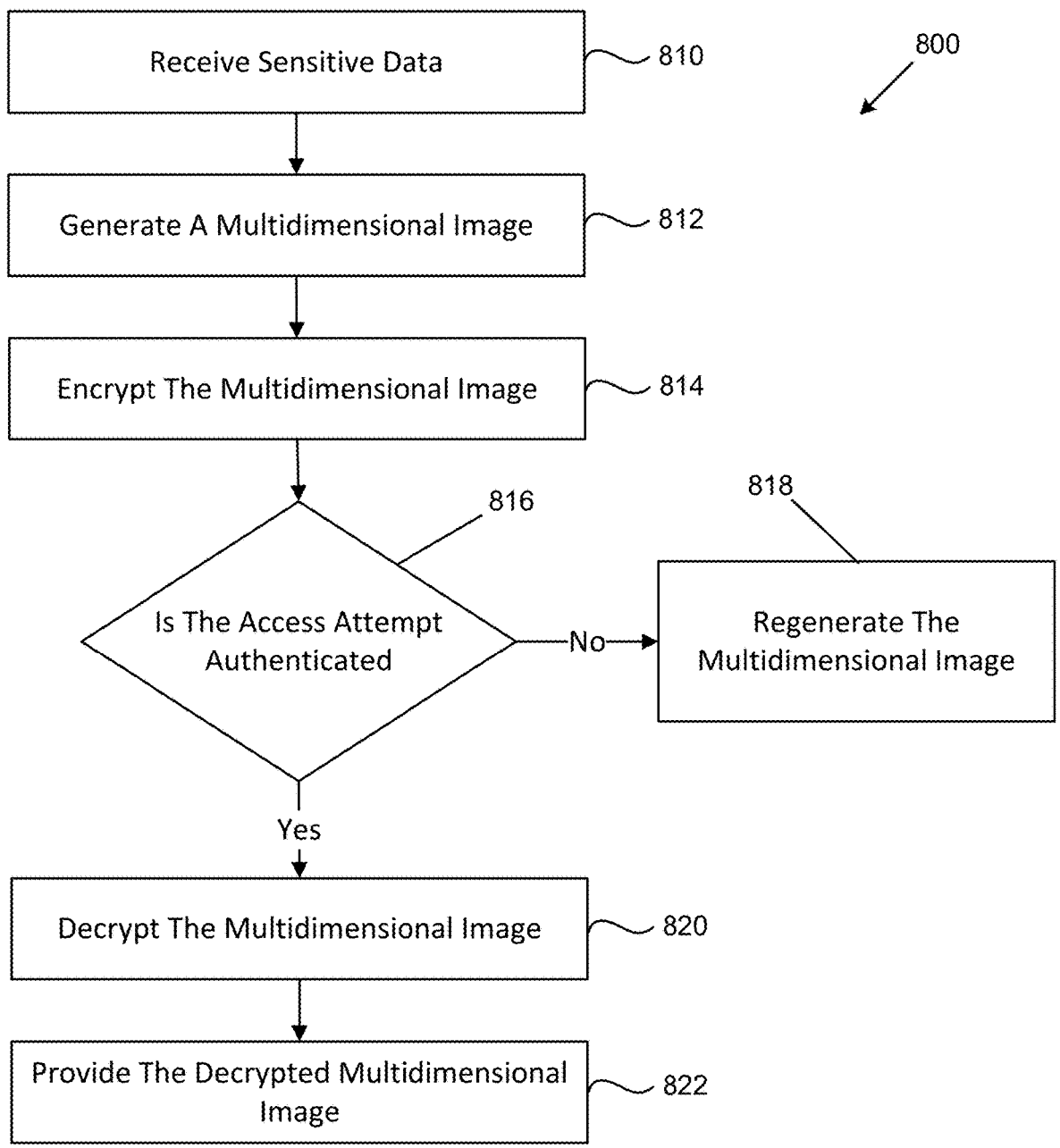
FIG. 8 shows an example method for generating a multidimensional image using the system of FIG. 1.

FIG. 8 illustrates an example method 800 for generating the multidimensional image 120 using the system 100. The method 800 includes steps 810-822. Some or all of the steps 810-822 may be performed by the server device 110.

At step 810, sensitive data is received. The sensitive data may be received by the server device 110. Further, the sensitive data may include personal information other data that needs to be secured to prevent insider trading or comply with applicable laws. Once received, a multidimensional image is generated at step 812. The multidimensional image includes the sensitive data.

Further, generating the multidimensional image includes encoding the sensitive data within the multidimensional image. The sensitive data may be encoded as a signature dimension within the multidimensional image. Step 812 may also include embedding metadata within the multidimensional data. This embedding may also include encoding various data associated with the sensitive data within the multidimensional image.

At step 814, the multidimensional image is encrypted. Encrypting the multidimensional image includes encrypting the data of the multidimensional image using quantum resistant algorithms. Proceeding to decision block 816, whether an access attempt is authenticated is determined. If the access attempt is not authenticated, the multidimensional image is regenerated at step 818. Step 818 may also include shifting data of the multidimensional image including at least the sensitive data encoded within the multidimensional image. For example, the data representing the sensitive data within the multidimensional image is shifted within the bits of the multidimensional image. In some embodiments, the step 818 includes collapsing the image based on a number of access attempts exceeding a predetermined threshold.

If the access attempt is authenticated, then the method 800 proceeds to step 820 where the multidimensional image is decrypted. Then, the decrypted multidimensional image is provided at step 822. In some embodiments, the decrypted multidimensional image includes the sensitive data displayed according to visualization parameters. In some embodiments, the decrypted multidimensional image is provided to the client device 112.

Figure 9:
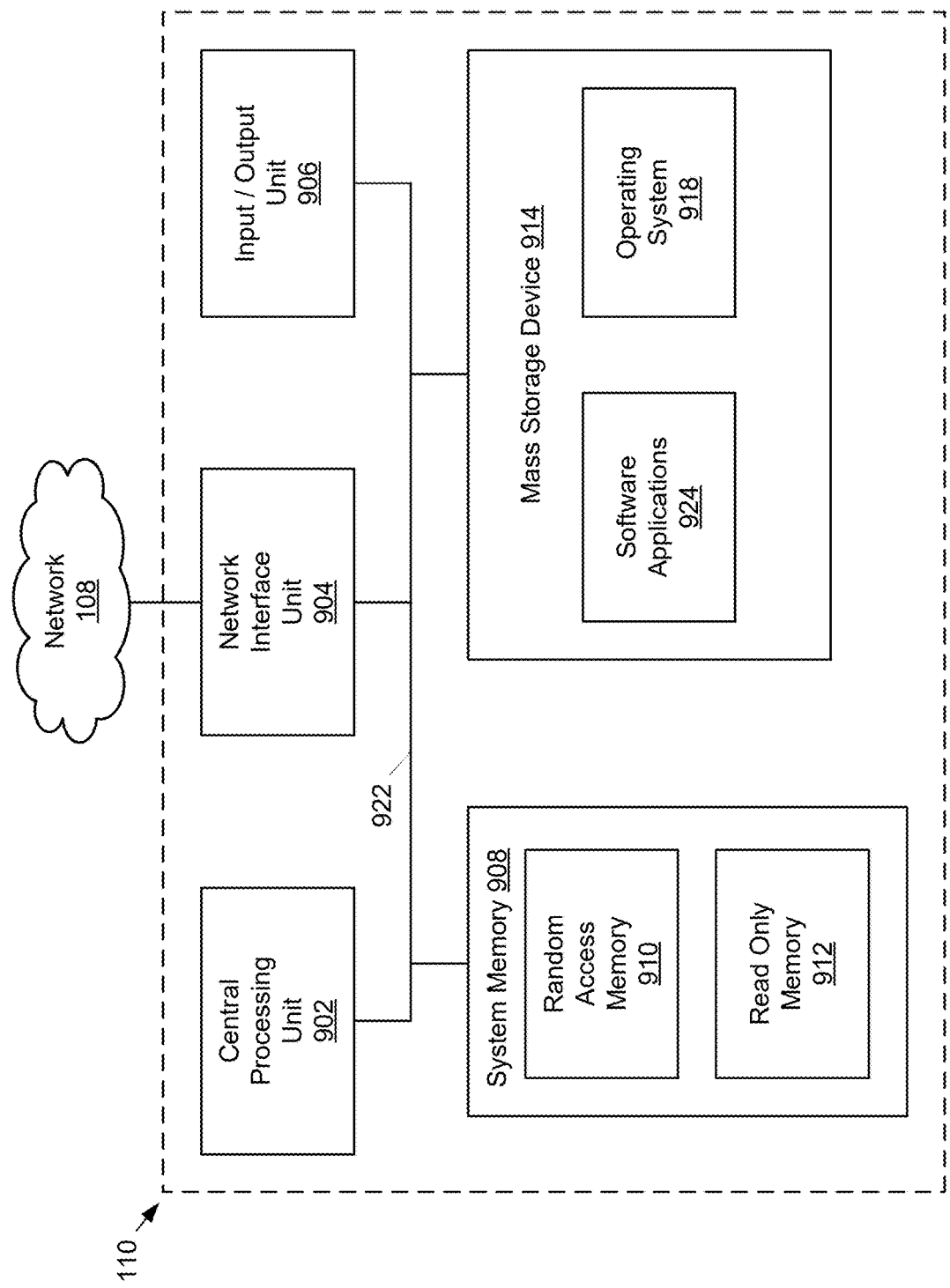
FIG. 9 shows example physical components of the server device of FIG. 2.

As illustrated in the embodiment of FIG. 9, the example server device 110, which provides the functionality described herein, can include at least one central processing unit ("CPU") 902, a system memory 908, and a system bus 922 that couples the system memory 908 to the CPU 902. The system memory 908 includes a random-access memory ("RAM") 910 and a read-only memory ("ROM") 912. A basic input/output system containing the basic routines that help transfer information between elements within the server device 110, such as during startup, is stored in the ROM 912. The server device 110 further includes a mass storage device 914. The mass storage device 914 can store software instructions and data. A central processing unit, system memory, and mass storage device similar to that shown can also be included in the other computing devices disclosed herein.

The mass storage device 914 is connected to the CPU 902 through a mass storage controller (not shown) connected to the system bus 922. The mass storage device 914 and its associated computer-readable data storage media provide non-volatile, non-transitory storage for the server device 110. Although the description of computer-readable data storage media contained herein refers to a mass storage device, such as a hard disk or solid-state disk, it should be appreciated by those skilled in the art that computer-readable data storage media can be any available non-transitory, physical device, or article of manufacture from which the central display station can read data and/or instructions.

Computer-readable data storage media include volatile and non-volatile, removable, and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid-state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server device 110.

According to various embodiments of the invention, the server device 110 may operate in a networked environment using logical connections to remote network devices through network 108, such as a wireless network, the Internet, or another type of network. The server device 110 may connect to network 108 through a network interface unit 904 connected to the system bus 922. It should be appreciated that the network interface unit 904 may also be utilized to connect to other types of networks and remote computing systems. The server device 110 also includes an input/output controller 906 for receiving and processing input from a number of other devices, including a touch user interface display screen or another type of input device. Similarly, the input/output controller 906 may provide output to a touch user interface display screen or other output devices.

As mentioned briefly above, the mass storage device 914 and the RAM 910 of the server device 110 can store software instructions and data. The software instructions include an operating system 918 suitable for controlling the operation of the server device 110. The mass storage device 914 and/or the RAM 910 also store software instructions and applications 924, that when executed by the CPU 902, cause the server device 110 to provide the functionality of the server device 110 discussed in this document.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computer system for securing sensitive data, the computer system comprising:
   one or more processors; and
   non-transitory computer-readable storage media encoding instructions which, when executed by the one or more processors, causes the computer system to:
     receive the sensitive data;
     generate a multidimensional image, wherein to generate the multidimensional image includes to:
       encode the sensitive data within the multidimensional image, and
       embed metadata within the multidimensional image,
     encrypt the multidimensional image;
     determine whether an access attempt is authenticated; and
     responsive to a determination that the access attempt is not authenticated, regenerate the multidimensional image by shifting data of the multidimensional image including at least the sensitive data encoded within the multidimensional image.

2. The computer system of claim 1, comprising further instructions which, when executed by the one or more processors, causes the computer system to:
   responsive to a second determination that the access attempt is not authenticated, collapse the multidimensional image.

3. The computer system of claim 2, wherein collapse the multidimensional image is further responsive to a number of access attempts exceeding a predetermined threshold.

4. The computer system of claim 3, wherein the metadata further includes the predetermined threshold.

5. The computer system of claim 1, wherein the metadata includes access permissions.

6. The computer system of claim 1, wherein encrypt the multidimensional image uses a quantum-resistant encryption technique.

7. The computer system of claim 1, comprising further instructions which, when executed by the one or more processors, causes the computer system to:
   embed an index within the multidimensional image.

8. The computer system of claim 1, comprising further instructions which, when executed by the one or more processors, causes the computer system to:
   collapse the multidimensional image after the multidimensional image has been stored for a predetermined threshold of time.

9. A method for securing sensitive data, the method comprising:
   receiving the sensitive data;
   generating a multidimensional image, wherein generating the multidimensional image includes:
     encoding the sensitive data within the multidimensional image,
     embedding metadata within the multidimensional image,
   encrypting the multidimensional image;
   determining whether an access attempt is authenticated; and
   responsive to a determination that the access attempt is not authenticated, regenerating the multidimensional image by shifting data of the multidimensional image including at least the sensitive data encoded within the multidimensional image.

10. The method of claim 9, further comprising:
    responsive to a second determination that the access attempt is not authenticated, collapsing the multidimensional image.

11. The method of claim 10, wherein collapsing the multidimensional image is further responsive to a number of access attempts exceeding a predetermined threshold.

12. The method of claim 11, wherein the metadata further includes the predetermined threshold.

13. The method of claim 9, wherein the metadata includes access permissions.

14. The method of claim 9, wherein encrypting the multidimensional image includes using a quantum-resistant encryption technique.

15. The method of claim 9, further comprising:
    embedding an index within the multidimensional image.

16. The method of claim 9, further comprising:
    collapsing the multidimensional image after the multidimensional image has been stored for a predetermined threshold of time.

17. A non-transitory computer-readable medium having stored thereon one or more sequences of instructions for causing one or more processors to perform:
    receiving sensitive data;
    generating a multidimensional image, wherein generating the multidimensional image includes:
      encoding the sensitive data within the multidimensional image,
      embedding metadata within the multidimensional image,
    encrypting the multidimensional image;
    determining whether an access attempt is authenticated; and
    responsive to a determination that the access attempt is not authenticated, regenerating the multidimensional image by shifting data of the multidimensional image including at least the sensitive data encoded within the multidimensional image.

18. The non-transitory computer-readable medium of claim 17, wherein the one or more sequences of instructions further cause the one or more processors to perform:

responsive to a second determination that the access attempt is not authenticated, collapsing the multidimensional image.

19. The non-transitory computer-readable medium of claim 18, wherein collapsing the multidimensional image is further responsive to a number of access attempts exceeding a predetermined threshold.

20. The non-transitory computer-readable medium of claim 19, wherein the metadata further includes the predetermined threshold.

* * * * *